(No Model.)  5 Sheets—Sheet 1.

J. T. COWLEY.
CASH REGISTER AND INDICATOR.

No. 443,982.  Patented Dec. 30, 1890.

Attest
Geo H Botts
Robert A Killond

Inventor
James T. Cowley
by G. H. Graham
Atty (No Model.)  5 Sheets—Sheet 2.

J. T. COWLEY.
CASH REGISTER AND INDICATOR.

No. 443,982.  Patented Dec. 30, 1890.

Attest
Geo H Botts
Robert A Killond

Inventor
James T. Cowley
by Geo H Graham
Atty.

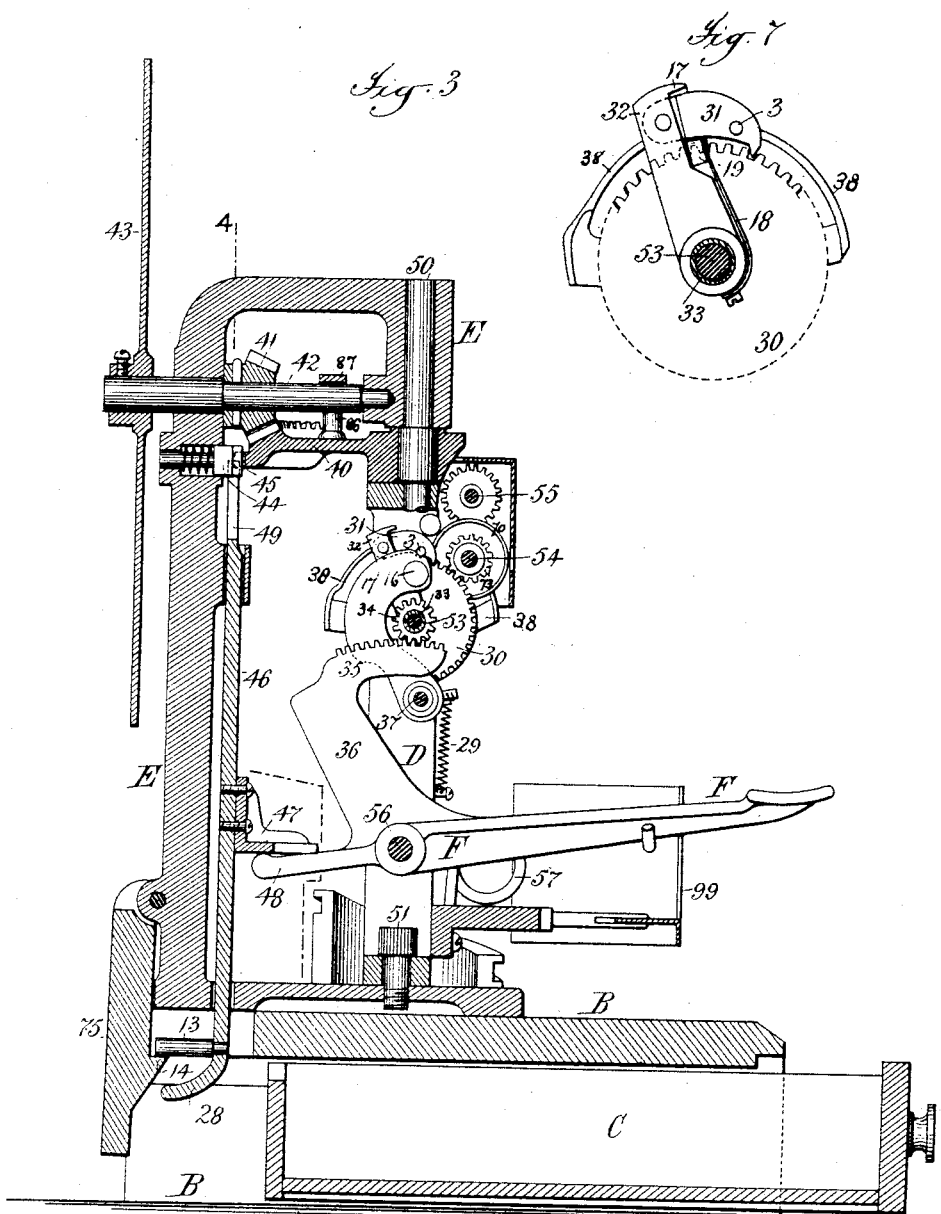

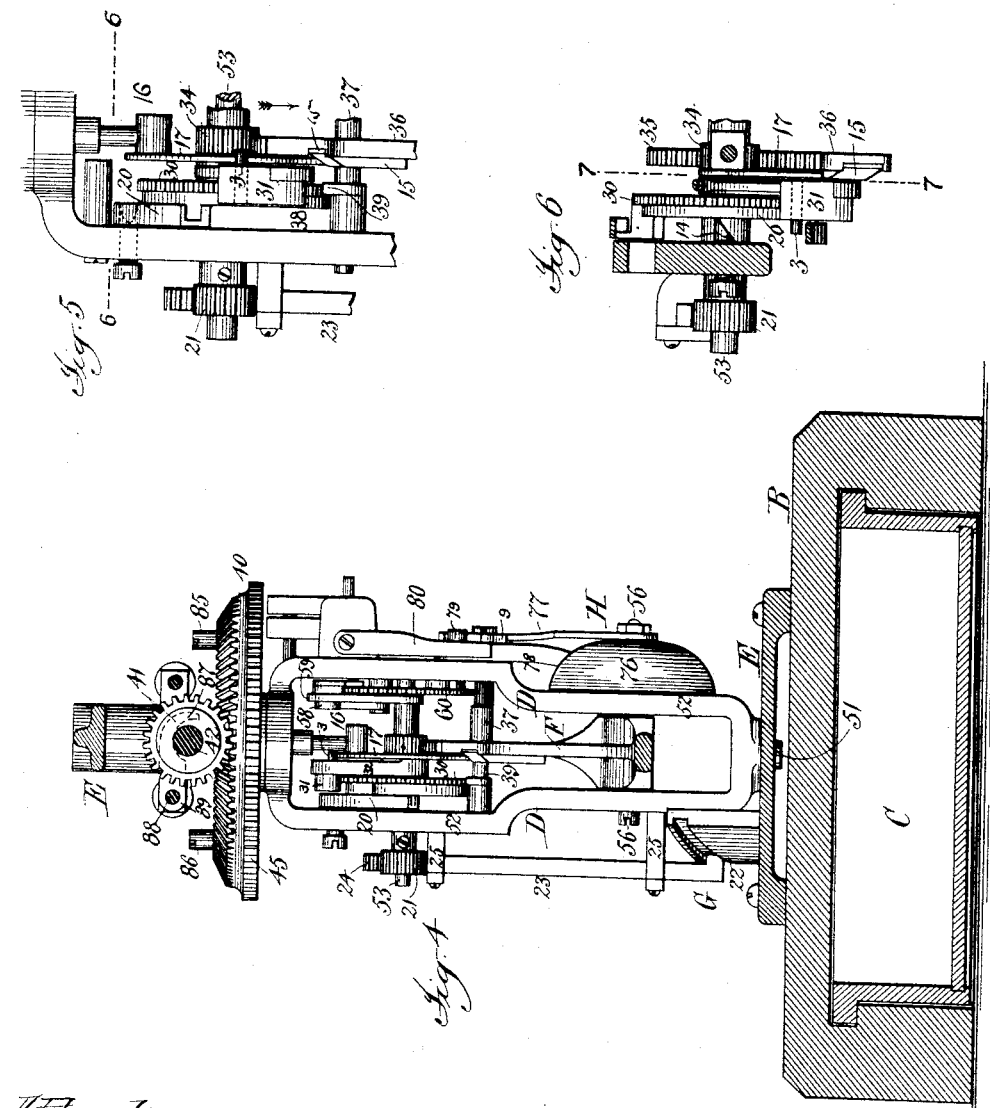

(No Model.) 5 Sheets—Sheet 5.
J. T. COWLEY.
CASH REGISTER AND INDICATOR.
No. 443,982. Patented Dec. 30, 1890.
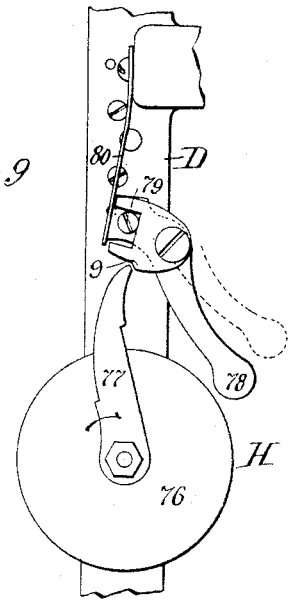
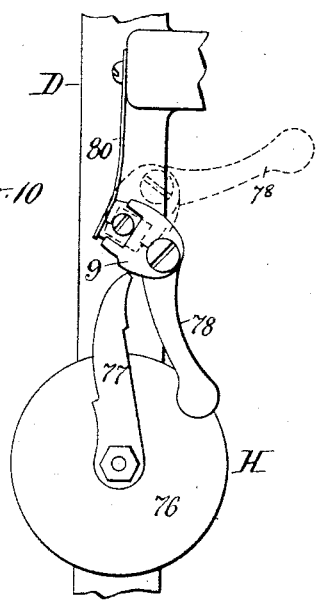
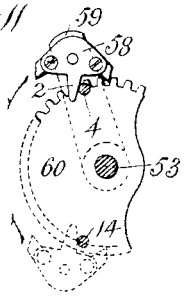
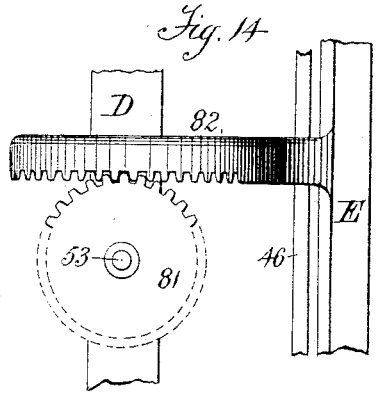
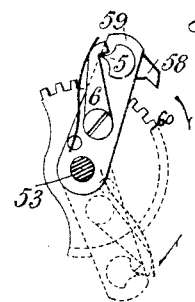
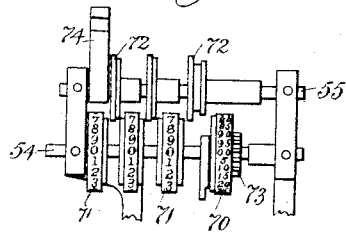
Attest:
Geo. H. Potts
Robert A. Killond
Inventor
James T. Cowley
by Geo. H. Graham
Atty.

UNITED STATES PATENT OFFICE.

JAMES T. COWLEY, OF LOWELL, MASSACHUSETTS.

CASH REGISTER AND INDICATOR.

SPECIFICATION forming part of Letters Patent No. 443,982, dated December 30, 1890.

Application filed January 31, 1890. Serial No. 338,756. (No model.)

*To all whom it may concern:*

Be it known that I, JAMES T. COWLEY, a citizen of the United States, residing at Lowell, county of Middlesex, and State of Massachusetts, have invented certain new and useful Improvements in Cash-Registers, fully set forth in the following description and represented in the accompanying drawings.

This invention relates to that class of registers now commonly known as "cash-registers"—that is to say, to that class of registers that are adapted to indicate each payment and at the same time add the successive payments to those previously made and indicated by the register.

The invention has for its object to provide a simple and inexpensive register that is compact in structure and accurate in its working.

To this end it consists in the novel structure, arrangement, and combination of parts too fully hereinafter set forth to need preliminary description.

Figure 8:
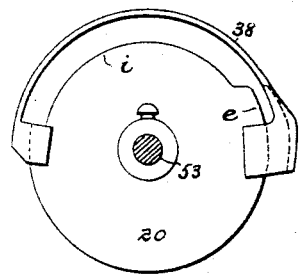
Figure 15:
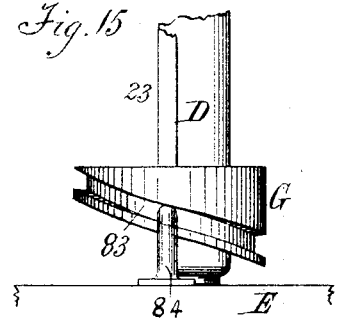
Figure 1:
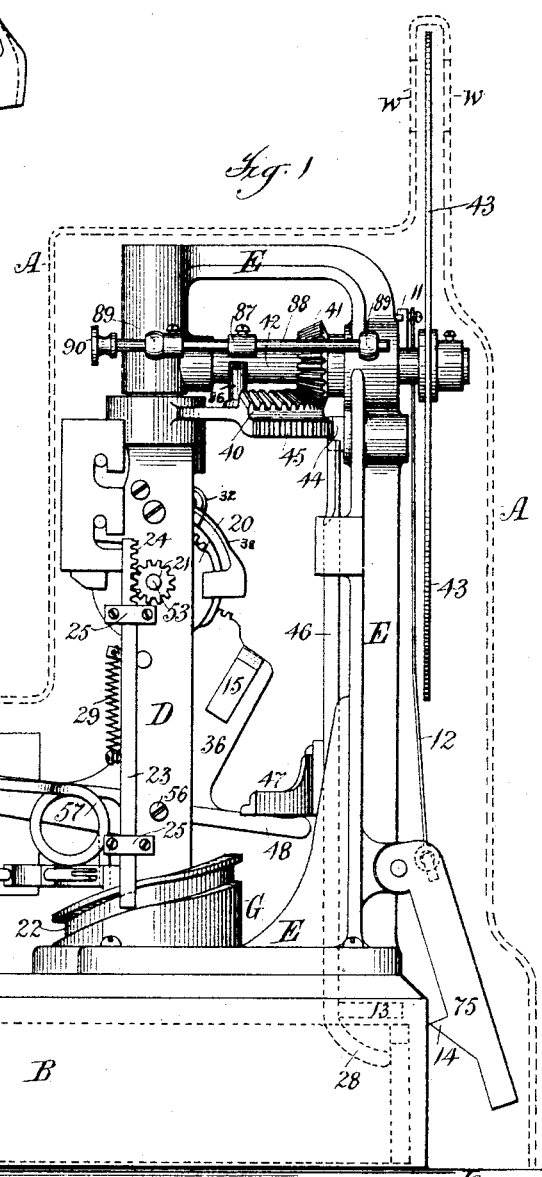
Figure 2:
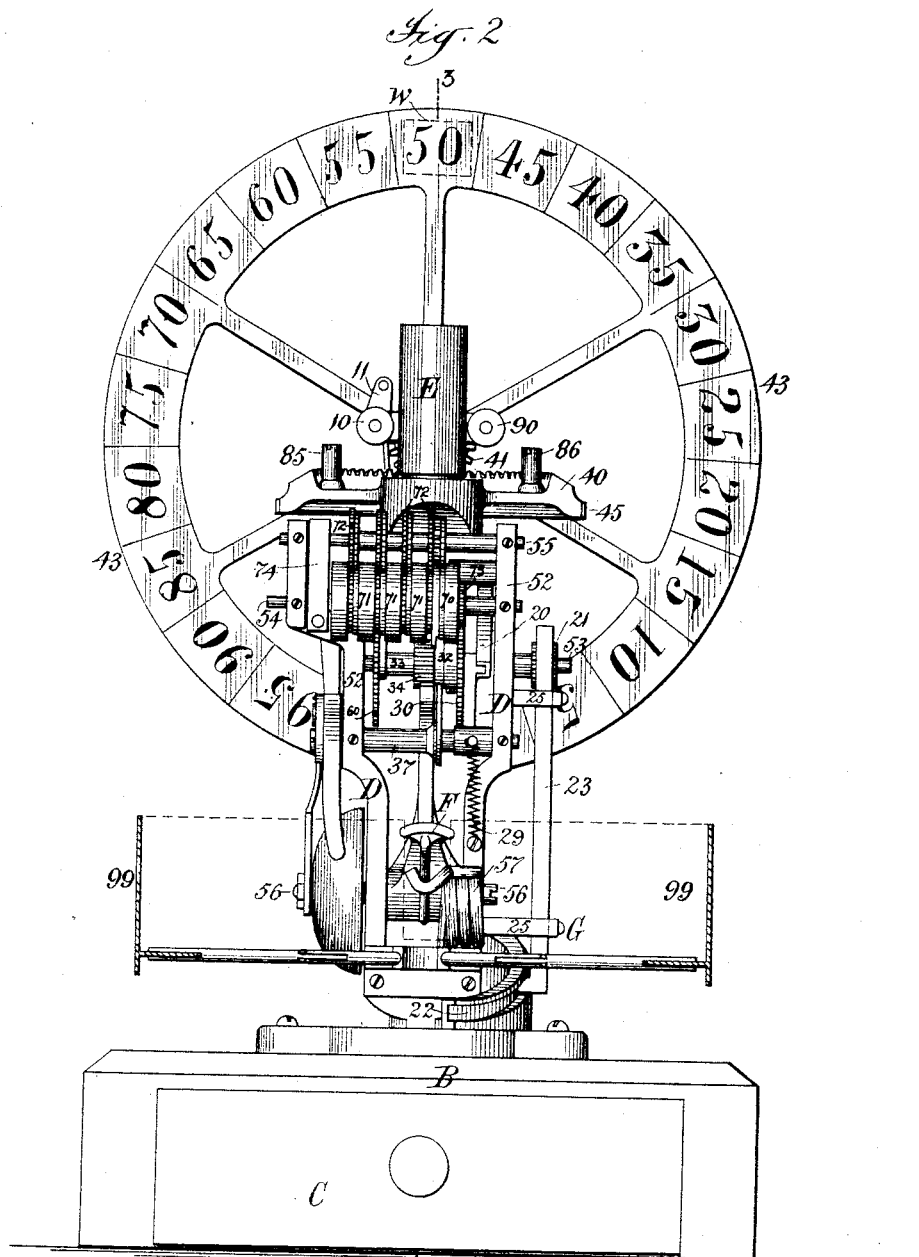

In the accompanying drawings, which illustrate a practical embodiment of the invention, Figure 1 is a side elevation of the improved register, the inclosing-case being removed, but indicated by dotted lines. Fig. 2 is a front view of the same, and a semicircular guard being in section. Fig. 3 is a central vertical section taken on the line 3 3 of Fig. 2. Fig. 4 is a vertical section taken on the line 4 4 of Fig. 3, looking at the rear of the swinging frame and its immediate connections. Fig. 5 is an enlarged detail showing particularly the registering-wheel, operating-pawl, and immediate connections. Fig. 6 is a horizontal section on the line 6 6 of Fig. 5, the parts being in a slightly-different position. Fig. 7 is a sectional elevation on the line 7 7 of Fig. 6, showing particularly the registering-wheel and operating-pawl. Fig. 8 is an elevation of the guard. Figs. 9 and 10 are elevations of the bell and hammer. Figs. 11 and 12 are opposite sectional elevations of the double click-pawl and its ratchet. Fig. 13 is a front elevation of the registering wheels or disks in their disconnected positions. Figs. 14 and 15 are elevations of modifications hereinafter referred to.

The improved register embraces a vibratory or swinging frame that is supported upon vertical pivots in a standard and adapted to be swung or vibrated to different positions horizontally. This vibratory frame carries the registering or adding devices consisting of a revoluble toothed or registering wheel and a series of adding and counting disks, by which the movement or movements of the toothed wheel are registered and preserved. The vibratory frame also carries an operating-handle, by which the frame may be vibrated horizontally to the different positions desired. This operating-handle is pivotally mounted in the vibratory frame and is connected to operate an operating-pawl that is in position to engage the toothed wheel of the registering devices referred to. The position to which this frame may be swung is made the means by which the degree of motion or extent of rotation imparted to the toothed wheel is regulated or determined to cause the registry of the proper amount. To effect this there is combined a shield or guard with the toothed wheel and the operating-pawl, the position of which shield or guard is changed simultaneously with the change in position of the vibratory frame by a controlling device, part of which is carried by the frame and the other part stationary with respect thereto. The improved register also embraces an indicator movable in unison with the vibratory frame and adapted to indicate the amount which the position of the vibratory frame and the controlling device referred to determines may be registered thereby. There is also provided a cash drawer or receptacle controlled by the movement of a movable part of the register, with means for locking the register against movement while the drawer or receptacle is open, and with means for placing the latter out of operative position. With this general understanding of the features of the improved register a detailed description thereof will now be given.

Referring to said drawings, it is to be understood that the register may be mounted within any suitable inclosing-case, which for the sake of perspicuity is simply indicated by dotted lines A, Fig. 1, a base B being provided to sustain the frame-work and to contain a drawer C.

The main parts of the improved devices are mounted in a vibratory frame D, that is provided with vertical pivots 50 51, held in bearings formed by a C-shaped standard E, the lower portion of said standard forming a foot for supporting the register and providing the means for securing the register in place, as upon the base B. The vibratory frame D consists of two vertical portions 52, separated a distance apart and providing near its lower end bearings for an operating-arm F and its upper end bearings for a rock-shaft 53, and for the shafts 54 55 of the adding-disks. The operating-arm F is made the means for conveniently turning the vibratory frame horizontally to the desired position within its range of movement, which in the present instance is about ninety degrees of a circle. The arm F is also made the means for actuating the operating-pawl after each adjustment of the frame, so that the desired value is added to the adding-disks, and thus said arm has two independent movements—a vibrating one in one direction, and as will hereinafter appear, a rocking one in a diametrically-opposite direction. With the frame D there is carried a semicircular guard-plate 99, having a vertical opening for the movement of the operating-arm, and forming a means of closing the opening in the inclosing-case A, through which the operating-arm extends.

The rock-shaft 53 carries a revoluble toothed or registering wheel 30, that is mounted to turn loosely thereon. The teeth of this wheel are engaged by an operating-pawl 31, that is carried at the outer end of a radial arm or pawl-carrier 32, that projects from a sleeve 33, carried by the rock-shaft 53. This sleeve, which is loose with respect to the rock-shaft, also carries a pinion 34, that is engaged by a toothed segment 35, formed at the end of a short-arm 36, extending from and forming a part of the operating-arm F. The operating-arm in the present instance is in the form of a bell-crank adapted to be rocked on pivots 56, so that each time it is rocked it will, through its toothed segment and pinion, impart the proper vibration to the operating-pawl and its arm, the movement of the pawl in one direction being idle. The rocking of the operating-arm F is had against the pressure of a suitable spring 57, which tends to keep it in its normal position and insures the return of the parts operated by the rocking of the arm to their normal position after each movement. The range of movement of the operating-pawl 31 is a constant one and is sufficient to rotate the toothed wheel 30 the extent necessary to register the highest amount at each vibration of the operating-arm for which the capacity of the register is adapted. There is provided therefor a movable guard or shield 20, by which the point at which the operating-pawl will engage with the teeth of the wheel 30 is determined. This guard is also mounted upon the rock-shaft 53, and is secured thereto so as to partake of any movement of the rock-shaft. The said guard lies contiguous to the toothed wheel 30, so that the operating-pawl, whose width is greater than the width of the toothed-wheel, will also overlie the periphery of the guard. The high part e of the guard corresponds with the periphery of the toothed wheel, but is provided with a circumferential depression i, deep enough to permit the pawl to engage with the teeth of the wheel 30 as it moves from the high part e. The extent of this depressed portion of the guard is sufficient to permit the pawl to engage with the toothed wheel early enough in its vibration to cause the wheel to be rotated sufficient to register the largest amount for which the register is capacitated; and in order to cause the pawl to engage with the said toothed wheel at later periods of its vibration the said guard will be moved so that the pawl will travel idly upon its high part e during the first part of its vibration before it arrives at the beginning of its depressed portion, when it will fall into engagement with the toothed wheel and carry the latter during the remainder of its vibration.

The means for automatically changing the position of the guard may be varied considerably from that shown, consisting, however, broadly, of a controlling device G, part of which is carried by the vibratory frame and the other part stationary with respect thereto. In the present instance the controlling device G consists of a pinion 21, secured to the rock-shaft 53, that is rocked through suitable connections from a cam 22. This cam 22, representing the stationary part of the controller, is secured to the foot of the standard E, and is engaged by a projection extending from a vertically-arranged rod 23, the upper end of which is provided with a toothed rack 24, that engages with the pinion 21. The vertical rod 23 moves in bearings formed in a pair of arms 25, extending from the vibratory frame D, so that in the change of position of the frame the vertical rod is carried therewith. The exterior surface of the cam 22 is concentric with the vertical axis of the vibratory frame, and its operating groove is such as to cause the shaft 53 and guard 20 to be rocked to a position that will determine the point in its vibration that the operating-pawl will engage with the toothed wheel 30, the high part of the cam being adapted to move the guard so as to permit the pawl to move the toothed wheel 30 a distance sufficient to register the highest amount for which the register is capacitated, and the low part thereof adapted to move the guard so that the lowest amount may be likewise registered, or no amount at all, and intermediate between the high and low parts of the cam adapted to move the guard, so that amounts ranging between the highest and lowest for which it is capacitated may be registered.

As the parts stand in Figs. 1, 2, and 3, the vibratory frame is represented as being midway between the limits of its movement in either direction, and consequently the controlling device holds the guard in position, so that upon the operation of the arm F the pawl will ride idly over the high part e of the guard for one-half of its vibration, the remaining half being in engagement with the toothed wheel 30, so that the value—in the present instance, fifty cents—will be registered.

The operating-pawl 31 is pivoted loosely at the end of the radial arm 32, and is provided with a tongue 19, against which bears a flat spring 18, carried by the radial arm, tending to force the pawl into engagement with the teeth of the wheel 30. The end of the arm 32 is provided with a shoulder 17, that overlies the upper face of the pawl and limits its outward movement.

The operating-pawl is provided with a pin 3 near its engaging end, that is loosely mounted within a perforation therein, and a little longer than the width of the pawl, so that it may project a short distance from one or the other of the sides of the pawl. During the idle movement of the pawl the said pin projects toward the center or vertical axis of the vibratory frame, so as to overlie and bear against the edge of a stationary plate 17, which is mounted at one end to a post 16 and at the other end to a tie-bar 37 of the frame D. The edge of this stationary plate is concentric with the axis of the toothed wheel 30, and is high enough to hold the pawl from engagement with the toothed wheel or from contact with the guard during its idle vibration. Upon the opposite side of the pawl the guard 20 carries a confining segmental ring 38, beneath which the pin 3 is projected at the proper moment, the effect of which is to hold the pawl in engagement with the wheel 30, so that it is prevented from accidentally skipping the first tooth of the wheel.

In the operation of the register during the depression of the operating-arm F the pawl is traveling in the direction of the arrow, Fig. 5. Its pin 3 bears, as shown, upon the edge of the plate 17, holding it from engagement with the toothed wheel. When at the limit of its movement in this direction, the pin is brought in contact with a projection, as 15, by which the pin is removed from contact with the plate and projected to the opposite side of the pawl, as shown in Fig. 6, where it is shown as traveling in the opposite direction. This projection 15 is preferably provided on the end of the arm 36 of the operating-arm F, which, moving simultaneously in the opposite direction to that of the pawl, meets the pin 3 at the limit of their movement in one direction. When the pin is in the position shown in Fig. 6, it is in position to pass under the confining-plate 38, and thus keep the pawl first in contact with the high part of the guard and then in engagement with a tooth of the wheel 30. At the end of the operating movement of the pawl there is provided a second projection 14, against which the end of the pin 3 will bear, so that it is moved to project from the opposite side of the pawl, ready again to bear upon the edge of the stationary plate 17. Of course the under or operating face of the confining-plate 38 is concentric with the axis of the toothed wheel 30, and corresponds with the high part e and depression i of the guard 20, as shown in Figs. 7 and 8. The toothed wheel 30 is engaged by a stop-pawl 39, that is mounted upon the tie-bar 37 and held to duty by a spring 29.

In order to insure the operating-arm being moved to the limit of its motion in both directions, there is provided a double click-pawl 58, Fig. 11, that is mounted at the end of a radial arm 59, extending from the sleeve 33 and moving in unison with the operating-pawl. The ends of this pawl are adapted to engage with the teeth of a fixed ratchet 60, that is concentric with the shaft 53, and by which the operating-arm is prevented from being returned to its normal position until it completes its stroke. The double pawl 58 is provided with a tongue 2, which at the limit of the pawl's movement in both directions contacts with the stops 4, which act to reverse the position of the pawl and permit the reverse movement of the operating-arm and its connections. The pivot of the pawl upon the opposite side of the arm 59 is provided with a tooth 5, (see Fig. 12,) that is engaged by a spring-pressed holding-detent 6, by which the pawl is held in its changed positions and is yet permitted to click over the teeth of the ratchet 60.

The necessary counting wheels or disks for preserving the registering movement of the wheel 30 may be of any ordinary construction. Thus there are provided the cents-wheel 70 and a series of dollar-wheels 71, loosely mounted upon the shaft 54, the totals of which wheels are transferred from one to the other by a series of wheels 72, that are loosely mounted upon the shaft 55. The movement of the wheel 30 is transferred immediately to the cents-wheel 70 through a pinion 73, carried by said cents-wheel, that meshes directly with the wheel 30. The particular construction of the counting and transferring wheels need not be specified, that shown being the well-known "Geneva" construction. Both the transferring-wheels and the counting-wheels, as before stated, are mounted loosely upon their respective shafts and are held in engagement with one another by an arm 74, that is loosely mounted upon the shaft 55, and extends in the space between the last counting-wheel and the portion of the frame supporting the shaft, as shown in Fig. 2. If it should be desired to return the wheels to zero, the inclosing-case A of the register will be opened, so that access may be had to the wheels or disks and to the arm 74 and the latter rocked upward into the position shown in Fig. 13, so that the counting and transferring wheels may be moved longitudinally upon their respective shafts out of engagement with each other, as shown in said last-named figure, when the counting-wheels may be readily turned to zero and both sets of wheels again assembled and the arm returned to its position, as in Fig. 2. The register is also provided with an indicator which will indicate to the purchaser and operator the amount to be registered or being registered by the machine.

The vibratory frame carries at its upper end a segmental beveled wheel 40, rigidly connected thereto and engaging with a beveled pinion 41, that is mounted upon and secured to a horizontal shaft 42, that is adapted to rotate in bearings provided in the standard E. The rear or outer end of the shaft 42 carries an indicator-wheel 43, secured thereto and bearing indicating-marks delineated on one or both of its faces, as shown in Fig. 2, said indicator-wheel bearing the indications of five cents to one dollar in multiples of five, the present register being capacitated to indicate and register those values. It will be understood, however, that the register may be capacitated to indicate more or less values without material alteration.

The indicator 43 is mounted within the inclosing-case A, as shown in Fig. 1, which latter is provided with sight-openings $w$, as indicated in Figs. 1 and 2, through which the values delineated upon the dial may be seen.

The connection between the indicator and the vibratory frame D is such that the indicator will be moved in unison with the frame and will indicate in any position of the frame the value that the register will add to the counting-wheels should the operating-arm be rocked.

In order to hold the vibratory frame in the different positions to which it may be moved, there is provided a spring-pressed dog 44, that is held in a suitable recess in the standard E, and is adapted to engage the teeth of a ratchet 45, formed on the periphery of the segmental beveled wheel 40, and against the pressure of which spring-pressed dog the frame is moved. The location of the teeth of the ratchet 45 is such that the frame will be held in position to cause an accurate register of the value which the position of the frame and the guard 20 may determine.

The range of movement of the vibratory frame may be limited by a pair of stops 85 86, projecting from the segmental beveled wheel 40 and adapted to contact with the opposite sides of the horizontal shaft 42. The stop 85 is also arranged to strike a removable abutment 87, (see Fig. 4,) so that the frame may be limited when in position to indicate and register the lowest amount—five cents; but upon moving the abutment to one side, so that the stop will strike the shaft, the frame will be limited when in a position to indicate and register nothing, which will be of importance in connection with the cash-drawer hereinafter described, so that the latter may be released to be opened without effecting any registry upon the registering wheels or disks. The abutment is mounted upon a rod 88, that is adapted to slide in bearings 89, and provided with a grasping-piece 90, as shown in Fig. 1, for readily moving the rod and abutment. Access to the movable abutment will be had by removing the inclosing-case or by opening a door therein.

As any movement of the vibratory frame after the operating-arm has commenced its movement will destroy the accuracy of the register by reason of the simultaneous movement of the guard 20, there is provided a lock that is moved in position to lock the frame against movement directly the operating-arm is moved. Thus there is provided a vertically-movable bar 46, guided in suitable bearings in the standard E, which carries an extending flange 47 in position to be borne upon by the projection 48 of the operating-arm F in whatever position the vibratory frame may occupy. The upper end of the vertical bar 46 is provided with one or more fingers 49, which normally rest immediately below the under face of the ratchet 45; but upon the first movement of the arm F, as shown in Fig. 3, the tongue or tongues 49 will have been moved into engagement with the ratchet-teeth, so as to lock the frame against movement until the bar is seated in its normal or low position.

The cash drawer or receptacle C may be of any ordinary construction adapted to slide in and out of the base B of the register and may be entirely independent of any movement of the register; but, as shown, there is provided a lock 28, which during the normal position of the parts holds the drawer in its closed position, as shown in Fig. 1. The lock is formed on the end of the vertical bar 46 and is movable therewith, so that shortly after the operating-arm F is moved to effect the registry of the desired amount the lock will have been raised sufficient to release the drawer and permit it to be moved outwardly either by hand, by gravity, or by the force of a spring. There is also provided in this connection a means by which the vibratory frame is held against movement while the drawer is opened. For this purpose there is provided an arm 75, pivoted at the rear of the register, having a shoulder 14, adapted to catch a pin 13, extending rearwardly from the vertical bar 46. The position of this shoulder 14 is such that when the pin 13 rests upon it the finger or fingers 49 at the end of the bar will be held in engagement with the ratchet 45, and thus lock the vibratory frame against movement. When the drawer is moved inwardly to its closed position, its rear wall first contacts with the inclined surface of the lock 28 and raises the bar 46 bodily; but as soon as the rear wall passes beyond the end of the lock 28 the latter and its bar are free to return to their normal or low position in front of said wall, while the said wall has previously rocked the arm 75 rearwardly, so that the shoulder 14 is out of the path of the pin 13, and the finger or fingers 49 are moved from engagement with the ratchet 45. If desired, the operation of the arm 75 may be dispensed with by raising it from operative position, as shown in Fig. 1, by means of a connecting-rod 12, extending to a crank 11 on the end of a rod operated from within the inclosing-case by a hand-wheel 10.

The register is provided with an audible alarm II, that is adapted to be sounded each time the operating-arm is moved. In the present construction there is provided a bell 76, that is secured to the pivot of the operating-arm and is moved therewith. The same pivot also carries an arm 77, the end of which as the arm is moved bears against a detent 9, carried by a bell-hammer 78. The hammer 78 is pivoted to the frame D upon a stud 79, and is provided at that end with a pair of seats against which a spring 80 may bear, so that the hammer may be held either in the position shown in Fig. 9 or in the idle position shown in dotted lines, Fig. 10, to which latter position it may be rocked by hand upon its pivot 79, and thus render the alarm inoperative. In the normal position of the parts the hammer lies, as shown in full lines in Fig. 9; but upon the movement of the operating-arm and the arm 77 the hammer will be rocked upon its pivot and then suddenly released by the passage of the end of the arm 77 over the detent 9, so as to strike the bell, as in Fig. 10. The detent 9 is provided with a flat plate pivoted to the side of the hammer and having a recess in which the head of the pivot 79 extends, which thus limits the movement of the detent.

In the modification of the guard-controller G shown in Fig. 14 the rock-shaft 53 is provided with a toothed wheel 81, that is engaged by the teeth of a rack 82, extending from and secured to the standard E. The toothed rack is concentric with the axis of the vibratory frame D, so that in the movement of the latter the wheel 81 will always be in engagement therewith, and will be rotated more or less in accordance with the movement of the frame. In this construction the immediate connection between the stationary part of the controller and the movable part is dispensed with. In Fig. 15, showing a further modification of the controller G, the cam 22 and projection from the rod 23 are reversed, the said rod 23 bearing a plate having a cam-groove 83, which is engaged by a projection 84, extending from the foot of the standard E. Of course the face of the cam-plate 83 will be concentric with the axis of the vibratory frame, so that its groove will always be engaged by the projection 84.

From the foregoing description it will be understood that the vibratory frame D carries all the devices necessary to effect the registry of the amount desired, and that such registering devices and the means for actuating them occupy substantially the same relative position in whatever position the frame may occupy. So far as the vibratory frame and the registering devices which it carries are concerned, they may be employed without the indicator and without the cash-receptacle previously described. When an indicator is not employed, or if it be employed, the inclosing-case may be provided with figures indicating the value that will be registered upon the operation of the operating-arm when the arm is in line with either of said figures. Thus such figures might be delineated upon the case, as at *m*, Fig. 1, immediately above the operating-arm, so that when the arm is in line with any of the figures it will be known that if the arm be then operated the register will add the amount indicated by the figures. It is also to be understood that in so far as the means for moving the indicator is concerned the registering devices and the means for operating them may be entirely independent of the vibratory frame.

What I claim is—

1. In a register, the combination of a movable frame, a registering-wheel carried by said frame, means for actuating said wheel, and a controller determining the extent to which the registering-wheel will be moved, substantially as described.

2. In a register, the combination of a movable frame, a registering-wheel carried by said frame, means for actuating said wheel, and a controller with the position of the movable frame determining the extent to which the registering-wheel will be moved, substantially as described.

3. The combination of a vibratory frame, a registering-wheel, an operating-pawl, an operating-arm, and connections between the latter and the pawl for moving the wheel, all carried by the frame, substantially as described.

4. The combination of a vibratory frame, a registering-wheel, an operating-pawl, a guard for determining the point at which the pawl shall engage with the wheel, a controller part carried by the frame and the other part fixed with respect thereto, and means for operating the pawl, substantially as described.

5. The combination of a vibratory frame, a registering-wheel carried thereby, means for actuating the wheel, a guard for determining the movement of the wheel, and a controller for adjusting the position of the guard with respect to the movement of the vibratory frame, substantially as described.

6. The combination of a vibratory frame, a registering-wheel carried thereby, an operating-pawl therefor, an operating-arm for actuating the pawl, and a controller for determining the position of the guard with respect to that of the frame, substantially as described.

7. The combination of a vibratory frame, a registering-wheel carried thereby, means for operating the wheel, a guard for determining the movement of the wheel, and a controller for regulating the position of the guard, consisting of a stationary cam, a pinion mounted to rotate with the guard, and connections between the pinion and the cam, substantially as described.

8. The combination of a vibratory frame, a rock-shaft mounted therein, a registering-wheel mounted loosely on the rock-shaft, an operating-pawl engaging with the wheel, an operating-arm also mounted in the frame and adapted to operate the pawl, a guard secured to the rock-shaft for determining the point at which the pawl will engage with the wheel, a pinion also secured to the rock-shaft, a stationary cam, and a vertical rod having a rack for engagement with the pinion and a projection for engagement with the cam, substantially as described.

9. The combination of a vibratory frame, a registering-wheel and means for operating it, all carried by said frame, and an indicator movable in unison with the frame, substantially as described.

10. The combination of a vibratory frame, a registering-wheel and means for operating the same, all carried by the frame, an indicator, and beveled wheels carried by the vibratory frame and indicator for moving the latter in unison with the frame, substantially as described.

11. The combination of a vibratory frame, a registering wheel and means for operating it, carried by the frame, and a stop for locking the frame in position, substantially as described.

12. The combination of a vibratory frame, a registering-wheel, an operating-arm, and means for actuating the wheel, all mounted in the frame, and a stop moved in position to lock the frame against movement simultaneous with the movement of the operating-arm, substantially as described.

13. The combination of a vibratory frame, a registering-wheel, an operating-arm, and connections for operating the wheel, all mounted in the frame, a ratchet movable with the frame, and a stop for engaging with the ratchet upon the movement of the operating-arm, substantially as described.

14. The combination of a vibrating frame, a ratchet carried thereby, an operating-arm, a vertically-movable stop-bar stationary with respect to the frame, and connections between the operating-arm and stop-bar for moving the latter into engagement with the ratchet, substantially as described.

15. The combination of a toothed wheel, an operating-pawl therefor, a laterally-sliding pin carried by the pawl, a stationary plate on one side of the pawl and a confining-plate on the opposite side, and means for moving the pin from the control of the stationary plate to the control of the confining-plate, substantially as described.

16. The combination of a toothed wheel, an operating-pawl therefor, an operating-arm for actuating the pawl, a laterally-moving pin in the pawl, a stationary plate and confining-plate, one arranged upon opposite sides of the pawl for coaction with the pin, and a projection carried by the movable arm for moving the pin in an opposite direction, substantially as described.

17. The combination of a vibratory frame, a registering-wheel and means for actuating it, carried by the frame, a limiting-stop for limiting the movement of the vibratory frame in one direction, and a removable abutment coacting with the stop to vary the limits of movement of the frame, substantially as described.

18. The combination of a vibratory frame, a registering-wheel and means for actuating it, mounted in the frame, a ratchet movable with the frame, a stop-bar for engaging with the ratchet to lock the frame in position, a cash-receptacle, and a lock also carried by said bar for locking the receptacle when closed, substantially as described.

19. The combination of a vibratory frame, a registering-wheel and means for operating it, carried by the frame, a cash-receptacle, a lock engaging therewith, and means for operating the lock to release the receptacle simultaneous with the operation of the registering-wheel, substantially as described.

20. The combination of a vibratory frame, a registering-wheel and means for operating it, carried by the frame, a ratchet also carried by the frame, a cash-receptacle, a vertically-movable bar having at one end a finger for engagement with the ratchet and at the other end a lock for engagement with the cash-receptacle, and means for actuating said bar simultaneous with the operation of the registering-wheel, substantially as described.

21. The combination of a vibratory frame, an indicator movable in unison therewith, an operating-arm carried by the frame, a cash-receptacle, a vertically-movable bar having a lock at one end for engagement with the receptacle, and connections between the bar and the operating-arm for moving the lock to release the receptacle, substantially as described.

22. The combination of a vibratory frame, a ratchet carried thereby, an operating-arm also carried by the frame, a cash-receptacle, a vertically-movable bar moved by the movement of the operating-arm and having at one end a finger for engagement with the ratchet and at the other end a lock for engagement with the cash-receptacle, a pin projecting from the bar, and a pivoted arm having a shoulder for engagement with the pin of the bar to hold its finger in engagement with the ratchet, substantially as described.

23. In a register, the combination, with a registering-wheel and means for actuating it, of a movable frame and a controller determining the extent to which the registering-wheel will be moved, part movable with the frame and the other part mounted independent thereof, substantially as described.

24. In a register, the combination of a registering-wheel, a controlling device determining the extent of movement to be imparted to said wheel, and a vibrating and rocking operating-arm, the position of which in its plane of vibration fixes the position of the controlling device and its rocking movement causing a movement of the registering-wheel, substantially as described.

25. In a register, the combination of a registering-wheel, a controlling device therefor, a movable frame, and a vibrating and rocking operating-arm, the position of which in one plane of movement and that of the frame determining the position of the controlling device and the other movement causing the registering-wheel to be actuated, substantially as described.

26. In a register, the combination of a registering-wheel, a controlling device therefor, an indicator, and a vibrating and rocking operating-arm, the position of which in one plane of movement fixes the position of the controlling device and that of the indicator and the other movement causing the registering-wheel to be actuated, substantially as described.

In witness whereof I have set my hand, this 4th day of January, 1890, in the presence of two witnesses.

JAMES T. COWLEY.

Witnesses:
   A. E. HUMPHREYS,
   A. O. AUSTIN.